US011150099B2

(12) United States Patent
Yurdakul et al.

(10) Patent No.: US 11,150,099 B2
(45) Date of Patent: Oct. 19, 2021

(54) DETECTING VEHICULAR DEVIATION FROM A SPECIFIED PATH

(71) Applicant: International Business Machines Corporation, Armonk, NY (US)

(72) Inventors: Reha Yurdakul, Istanbul (TR); Kelvin Mwega Kiana, Kiria-ini (KE); Jonathan Lenchner, North Salem, NY (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/355,989

(22) Filed: Mar. 18, 2019

(65) Prior Publication Data

US 2020/0300647 A1    Sep. 24, 2020

(51) Int. Cl.
*G01C 21/34*    (2006.01)
*G08G 1/01*    (2006.01)
*G01C 21/14*    (2006.01)
*G06N 20/00*    (2019.01)

(52) U.S. Cl.
CPC ......... *G01C 21/3461* (2013.01); *G01C 21/14* (2013.01); *G06N 20/00* (2019.01); *G08G 1/0129* (2013.01)

(58) Field of Classification Search
CPC .. G01C 21/3461; G01C 21/14; G08G 1/0129; G06N 20/00
See application file for complete search history.

(56) References Cited

U.S. PATENT DOCUMENTS

| | | | |
|---|---|---|---|
| 9,810,537 B2 | 11/2017 | Madapati | |
| 9,900,747 B1* | 2/2018 | Park | G07C 5/085 |
| 10,528,833 B1* | 1/2020 | Bhatnagar | A61B 5/1118 |
| 11,048,248 B2* | 6/2021 | Cella | G05B 23/0286 |
| 2010/0063725 A1* | 3/2010 | Miura | G08G 1/096741 |
| | | | 701/408 |
| 2011/0125688 A1 | 5/2011 | Bernard et al. | |
| 2014/0088858 A1* | 3/2014 | Stefan | B60W 30/18072 |
| | | | 701/123 |
| 2017/0089274 A1* | 3/2017 | Kolhouse | F02D 41/0002 |
| 2018/0122016 A1 | 5/2018 | Oduor et al. | |
| 2018/0170430 A1 | 6/2018 | Shimizu | |

(Continued)

OTHER PUBLICATIONS

Ferreira J., J., et al., "Driver behavior profiling: An investigation with different smartphone sensors and machine earning", PLoS One, Received Aug. 12, 2016, Accepted Mar. 17, 2017, Published Apr. 10, 2017, 16 pages 12 (4): e0174959, http://journals.plos.org/plosone/article?id=10.1371/journal.pone.0174959.

(Continued)

*Primary Examiner* — Russell Frejd
*Assistant Examiner* — Demetra R Smith-Stewart
(74) *Attorney, Agent, or Firm* — Scully, Scott, Murphy & Presser, P.C.; Shimon Benjamin

(57) ABSTRACT

Amount of distance and/or time spent driving off-road by a vehicle during a specified drive may be detected. Readings from a location device and accelerometer sensor of the vehicle may be compared with historical readings of other vehicles taking similar drives, and for example, with similar driving behaviors, to detect off-road driving by the vehicle.

20 Claims, 5 Drawing Sheets

(56) References Cited

U.S. PATENT DOCUMENTS

2018/0281797 A1 10/2018 Berels et al.
2019/0324431 A1* 10/2019 Cella ..................... G06N 3/006

OTHER PUBLICATIONS

Kalra, N., et al., "Analyzing Driver Behavior using Smartphone Sensors: A Survey", International Journal of Electronic and Electrical Engineering, 2014, Accessed on Mar. 6, 2019, pp. 697-702, vol. 7, No. 7, https://pdfs.semanticscholar.org/bdcb/3d0fcfc961d84794ecf85b8d2635012ec211.pdf.
Eren, H., et al., "Estimating Driving Behavior by a Smartphone", 2012 IEEE Intelligent Vehiclea Symopisum, Jun. 3-7, 2012, pp. 234-239.
Walcott-Bryant, A., et al., "Harsh Brakes at Potholes in Bairobi: Context-Based Driver Behavior in Developing Cities", 2016 IEEE 19th International Conference on Intelligent Transportation Systems (ITSC), Nov. 1-4, 2016, pp. 675-681.

* cited by examiner

DETECTING VEHICULAR DEVIATION FROM A SPECIFIED PATH

BACKGROUND

The present application relates generally to computers and computer applications, and more particularly to vehicle acceleration and travel paths.

Designated areas exist, which are set aside, for example, for enjoyment, recreation, protection of natural environment and wildlife. A park, such as a national park, is an example of such an area. Visitors are expected to stay on designated roads at all times, and not drive off-road or drive into unauthorized spaces, for example, for safety reasons. In national parks, for example, there may be park rangers who can detect vehicles driving off designated roads and issue a warning.

BRIEF SUMMARY

A system, in one aspect, may include at least one hardware processor. At least one hardware processor may be coupled with a memory device. At least one hardware processor may be configured to receive a data packet indicating a route of a target vehicle. At least one hardware processor may also be configured to, based on signals received by a location device, determine that the target vehicle has traveled through a set of waypoints in the route. At least one hardware processor may also be configured to partition the route into segments according to the set of waypoints and known road segments. At least one hardware processor may also be configured to receive classes of vehicles classified into groups according to driving attributes. At least one hardware processor may also be configured to, for a class of vehicles, receive a mean value and a standard deviation value associated with acceleration in x, y and z directions. At least one hardware processor may also be configured to, for a route segment, detect an amount of off-road driving done by the target vehicle, based on comparing x, y and z components of acceleration associated with the target vehicle with one or more statistics associated with these components from the class of vehicles, the target vehicle identified with the class of vehicles. At least one hardware processor may also be configured to aggregate the amount of off-road driving done by the target vehicle detected for a plurality of route segments. At least one hardware processor may also be configured to output the aggregated amount of off-road driving done by the target vehicle.

A method, in one aspect, may include receiving a data packet indicating a route of a target vehicle. The method may also include, based on signals received by a location device coupled with the target vehicle, determining that the target vehicle has traveled through a set of waypoints in the route. The method may also include partitioning the route into segments according to the set of waypoints and known road segments. The method may also include receiving classes of vehicles classified into groups according to driving attributes. The method may also include, for a class of vehicles, determining a mean value and a standard deviation value associated with acceleration in the x, y and z directions of the vehicles in the class. The method may also include, for a route segment, detecting an amount of off-road driving done by the target vehicle, based on comparing the x, y and z components of acceleration associated with the target vehicle with one or more statistics associated with these components from the class of vehicles, the target vehicle identified with the class of vehicles. The method may also include aggregating the amount of off-road driving done by the target vehicle for a plurality of route segments. The method may also include outputting the aggregated amount of off-road driving done by the target vehicle.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Method, system and technique are disclosed, which may detect a vehicle that has driven, off-road from a given or designated path in an area. In some embodiments, such detection may be performed using a location device or location-enabled chip, e.g., a Global Positioning System (GPS) enabled chip (e.g., an integrated circuit implemented to receive location or GPS signals from satellites and transmit the data to another device) operating in conjunction with an accelerometer and may include learning, with confidence, when a car is driving off-road, or has driven off-road. Using an accelerometer with a GPS enabled chip may provide for more accurate detection, for instance, in cases in which some uncertainty may exist in determinations with GPS data alone. In some embodiments, a GPS enabled chip by itself can be used for this determination. For instance, if a vehicle has driven far enough off-road and has spent enough time off-road, the GPS enabled chip itself (e.g., without the accelerometer data) may be used to detect whether the vehicle has traveled off-road and is outside an allowed area.

In some embodiments, a location-enabled chip such as a GPS chip may be used to estimate the closest road to where the vehicle was at any portion of a trip through the area. An artificial intelligence model is trained to estimate the time spent on each road segment and the expected number of accelerations and decelerations in 3 directions (e.g., in each of the x, y, and z-directions) by driver type, by taking an aggregate of all drives, by all vehicles, over each road segment and measuring accelerations and de-accelerations in time. On average, vehicles tend to stay on-road with respect to any road-segment. Large numbers of accelerations and de-accelerations can be indicative of off-road driving.

Figure 2:
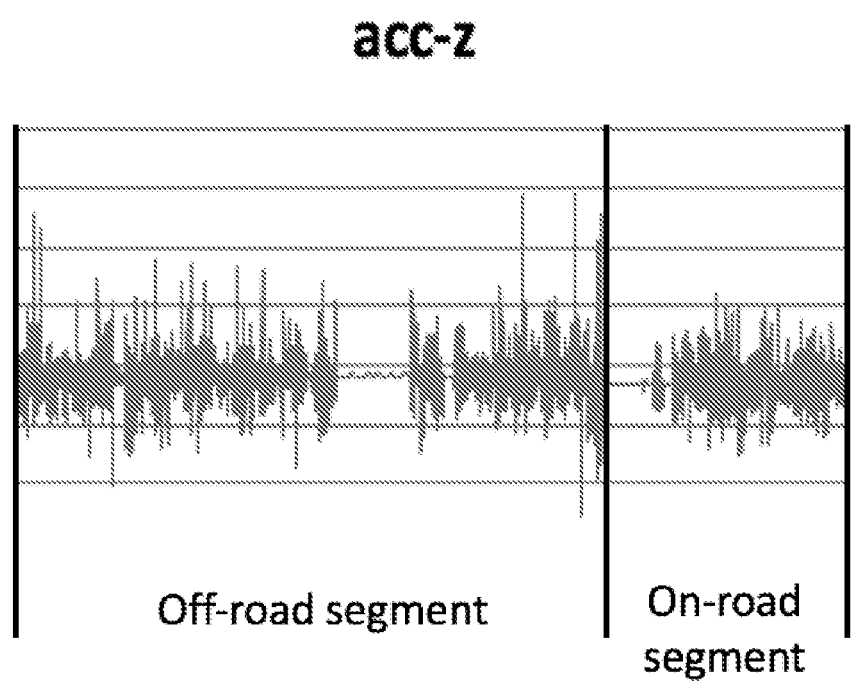
FIG. 2 illustrates sample z-components of acceleration measured by an accelerometer while driving off-road and on-road in a sample area.

An accelerometer can be an electromechanical device. In some embodiments, readings of each of the three axes of acceleration can be considered as independent features in a learning process to determine patterns of acceleration and de-acceleration that are indicative of a driver driving on a designated road versus a driver driving off-road. Each road segment may have different characteristics. For example, a road segment that frequently passes large animals will have more expected accelerations and de-accelerations than a road that typically does not have animals present. Briefly, the three axes of acceleration measured in an accelerometer are the x-axis (left/right direction), y-axis (forward/backward direction) and z-axis (up/down) direction. In one aspect, sudden variations in the z-component of acceleration can be considered the most indicative of off-road driving, for example, as shown in FIG. 2. FIG. 2 illustrates the z-component of acceleration while driving off-road and on-road in a sample area.

In some embodiments, the positive y-direction is considered to be the forward direction of a vehicle, the positive x-direction to be the right side direction with respect to a vehicle facing forward, and the positive z-direction to be the upward direction with respect to the vehicle. Accelerations and decelerations in each of the axis-aligned directions provide a signal as to whether or not a vehicle (and its occupant, if any) is riding off-road. Different vehicles or drivers of vehicles may have different driving behaviors, such as different ways of applying gas to the engine through the acceleration pedal. For instance, some may exhibit heavier, slower motion in applying the acceleration pedal, while others have lighter, quicker motion. It may be observed that driving behavior that exhibits sudden and quick motions (e.g., also referred to as jerky driving) tends to alter the x-component of acceleration, while heavier and slower application of the acceleration pedal tends to alter the y-component. In consideration of such factors, a model learns acceleration and deceleration patterns of vehicles (e.g., self driving vehicles) and groups of characteristic individuals based on a sampling of a population of vehicles and/or drivers over various road segments.

In one aspect of a system and/or method, the amount of distance and time spent driving off-road during a specified drive may be tracked, for example, by incorporating readings from a location device (such as GPS) and accelerometer sensors. The readings of such devices during the drive may be compared with historical readings of other vehicles or drivers taking similar drives. Degree of deviation from the norm may be detected based on a comparison. In some aspect, the geo-locating device, such as a GPS chip, and accelerometer sensors can be contained in a self-contained Internet of Things (IoT) device, for example, distinct from a smartphone device, a tablet device or another device. In some aspects, such an IoT device can be embedded in a vehicle, and e.g., hidden from a view. In some aspect, a geo-locating device and accelerometer sensors can be incorporated in a smartphone or like device mounted at a rigid point within a vehicle, for example, mounted on the front dashboard. In some aspects, a vehicle may also contain an embedded sensing or emitting device communicating with a smartphone, or like device. In some aspects, vehicles and/or drivers of vehicles may be classified into groups or classes based on associated driving behavior. A driving behavior of a vehicle or a driver of vehicle may be compared with other vehicles or drivers within the same class, for instance, to detect anomalous driving. Vehicles may include automated self-driving vehicles or manually driven vehicles.

Figure 1:
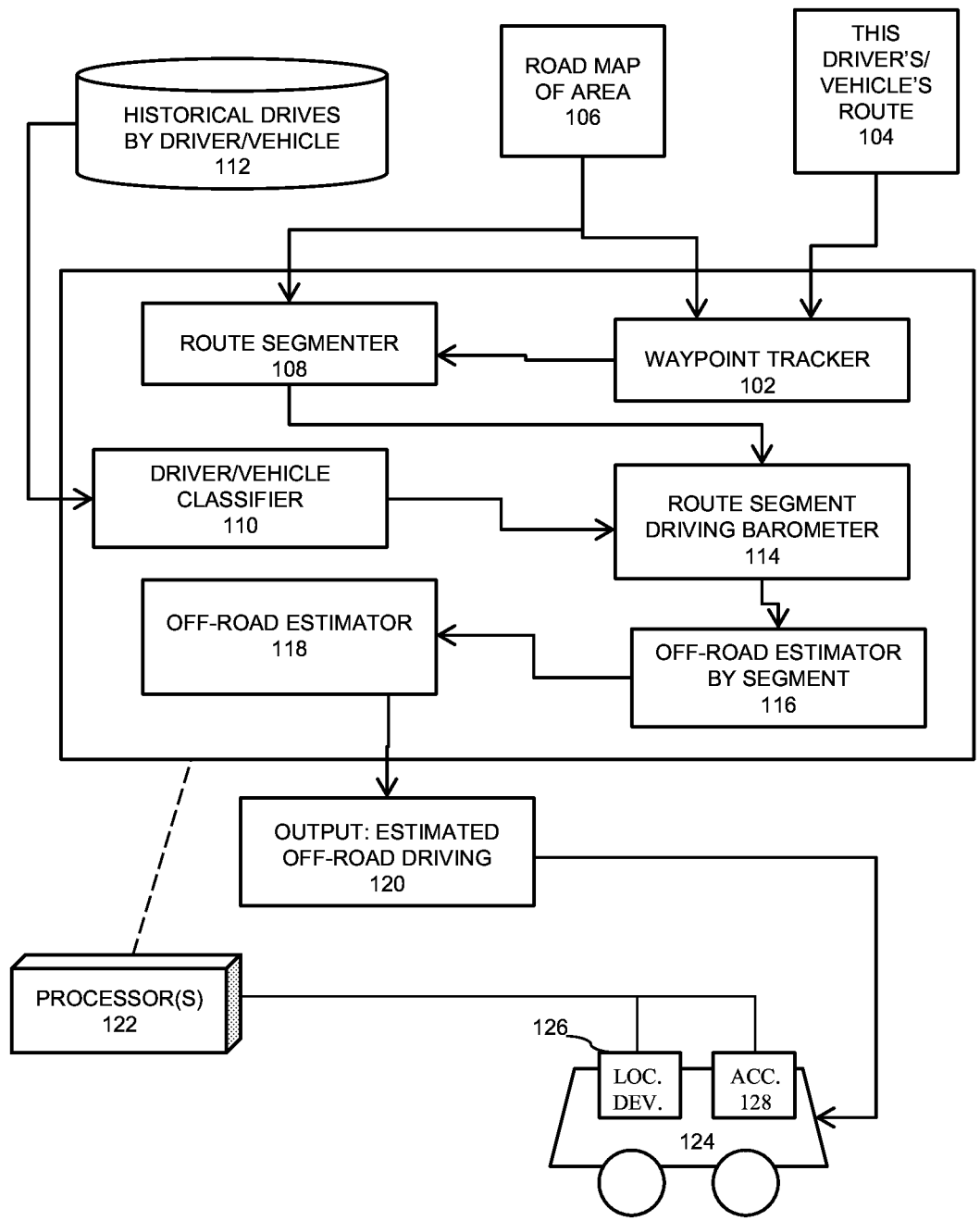
FIG. 1 is a diagram illustrating components of a system in one embodiment.

FIG. 1 is a diagram illustrating components of a system in one embodiment. Components shown include computer-implemented components, for instance, implemented and/or run on one or more hardware processors, or coupled with one or more hardware processors. One or more hardware processors 122, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A waypoint tracker component or functionality 102 may receive a vehicle's route 104 (also referred to as a target vehicle's route for simplicity of explanation) and a road map of an area 106, for instance, which may include a specified path a target vehicle 124 is authorized to travel. For example, a data structure or data packet may include data associated with the latitude and longitude of the edges of the side of the road on which the driver is able to drive at various junctures (also referred to as waypoints) along the route. Waypoint tracker component 102 may use GPS or another location tracking device equipped in the target vehicle 124 to detect the target vehicle 124 passing one or more designated waypoints on the road map 106. Points in time the target vehicle passes designated waypoints may be recorded. The target vehicle 124 may include a location device 126 such as a GPS receiver or device, which may receive signals from satellites and perform triangulation to determine the vehicle's location. The target vehicle 124 may also include an accelerometer 128, or the accelerometer can be present on an external device such as a smart phone that can measure the acceleration/deceleration of the target vehicle 124.

A route segmenter component or functionality 108 segments the route taken by the target vehicle according to the detected waypoints. For example, suppose waypoints $W_1$, $W_2$, . . . , $W_N$ are encountered in this same order. The segments are then $W_1 W_2$, $W_2 W_3$, . . . , $W_{N-1} W_N$. Because of the possibility of roads forking, many sequences of encountered waypoints and associated road segments are possible.

Historical driving behaviors 112 of drivers and vehicles, for example, those that have driven through, or in the area, may be stored in a storage device, for example, as structured data in a database. For instance, a database record associated with a driver or vehicle may include the route segments taken by the driver or vehicle, average speed, standard deviation of this speed, and amount of time spent completely stationary while driving through these segments, mean acceleration/deceleration values and standard deviations (e.g., the mean and standard deviation of the x, y z directional values as measured by an accelerometer coupled with or associated with the vehicle). Given historical driving behaviors 112, a driver or vehicle classifier component or functionality 110 may group drivers or vehicles into classes based on perceived driving behavior of the drivers or vehicles, e.g., jerkiness or suddenness in vehicle movement, e.g., with an accelerator and break pedal, which is perceived as large changes in acceleration in a short time duration in the x- or y-directions. In some embodiments, classification may be performed based on unsupervised machine learning algorithms such as the K-means algorithm, which clusters similar items (in this case drivers or potentially self-driving cars) in a same cluster or class. Other classification algorithms may be utilized.

In some embodiments, like drivers are grouped considering that drivers who drive similarly on-road also tend to drive similarly off-road. In some embodiments, a high standard deviation (e.g., exceeding a predefined threshold) in the x-component of acceleration for a given segment of road may be indicative of likely off-road driving. Such predefined threshold may be different for different class of drivers. Another feature that can be correlated with off-road driving is lengthy periods of being stationary. A signature of driving off-road can be acceleration to a location (e.g., sightseeing point) followed by a period of being stationary.

In some embodiments, the classifier 110 may be a previously trained classifier, which when executed with an input driving behavior, can classify the input driving behavior. In some embodiments, the training of the classifier 110 may be performed outside of the processor 122, for example, by another processor, and the processor 122 may receive the trained classifier for execution.

A route segment driving barometer component or functionality 114 may estimate the average or mean ($\mu$) and the standard deviation ($\sigma$) for values of acceleration and deceleration in the x, y, z directions for each class of drivers or vehicles (e.g., classified by driver classifier 110). Similarly, for each class of drivers or vehicles, route segment driving barometer component or functionality 114 may estimate the average or mean ($\mu$) and the standard deviation ($\sigma$) for the value of the speed while driving, the average or mean ($\mu$) and the standard deviation ($\sigma$) for the number and duration of stops. It can also provide a mean and standard deviation for the path taken by the vehicle, for example, an accumulation of most likely locations in (latitude, longitude) at that point in time, and an estimate of the uncertainty regarding the position. The path with this moving uncertainty bar around it approximates a thickened polygonal path, the slower the vehicle travels the less the uncertainty bar.

An off-road estimator by segment, functionality 116, may estimate an amount of off-road driving (e.g., by at least one of distance and time) that has been done on a given road segment, and a standard deviation of the estimate. For example, at a point (e.g., each point) along the path taken by a vehicle a likely location of the vehicle may be estimated based on a GPS reading or GPS readings of a given time period (e.g., current time period), interpolation of prior GPS readings, integration of acceleration and potentially velocity measurements (e.g., from the vehicle itself, if available). An assessment of how changes in the x, y, and z-components of acceleration differ from the mean for the particular class of driver and/or vehicle can also be used to determine the amount of off-road driving. Estimates of uncertainty may be contributed by innate uncertainty in the above measurements and also by the degree to which the different ways of measuring and/or interpolating position agree or disagree with one another. At a point (e.g., each point), a likely location and a probabilistic spread of where else the vehicle might be can be approximated using a 2-dimensional (2D) Gaussian distribution. From this Gaussian distribution, and a road map (e.g., knowledge of where the road is located), a probability of being off-road can be computed, e.g., at any point along the path. For example, if the center of the path at a given point is on-road but the uncertainty bar of one standard deviation is at the on-road/off-road boundary on one side of the road then the probability of being off road is approximately $(1-0.6827)/2 \approx 0.1587$, using values for the area under a standard normal distribution. Integrating the probability of being off-road at a point (e.g., any point) along the entire mean path can provide an estimate of the total length of travel that was taken off-road. Integrating over the total time spent can provide an estimate of the time spent off-road.

In another aspect, methods for estimating the standard deviation of the estimates of total distance or time traveled off-road can be based on one or more rules. For a point (e.g., any point) along the path, a system and/or method may repeatedly sample from the 2D distribution of the estimated location, use this value as a re-estimated mean and compute the probability, from that mean, of being off-road. From these samples, a system and/or method may compute a standard deviation of the measurement of percentage off-road for the given point. Integrating the random variable $X^2-\mu^2$ (where X is the percentage of off-road travel), over the entire path length and dividing by the path length can provide an estimate of the variance (e.g., standard deviation) of the total off-road amount. Integrating over time can provide an estimate of the standard deviation of the total time spent off-road.

In one embodiment, the target vehicle's drive on a given segment can be compared with the estimated average and standard deviation of other drivers in the same class, e.g., estimated by the off-road estimator by segment component or functionality 116.

A total off-road estimator component or functionality 118 may sum the off-road estimates and compute standard deviations based on the values obtained for segments (e.g., for all segments) at 116, producing total estimate of distance and/or time driven off-road. Estimated distance and time spent off-road with standard deviations of estimates may be provided as output 120. In some embodiments, a notification or alert signal can be transmitted to the target vehicle 124, based on the output, for example, if it is determined that the target vehicle has traveled outside of the specified path by more than a threshold tolerance level or value.

Figure 3:
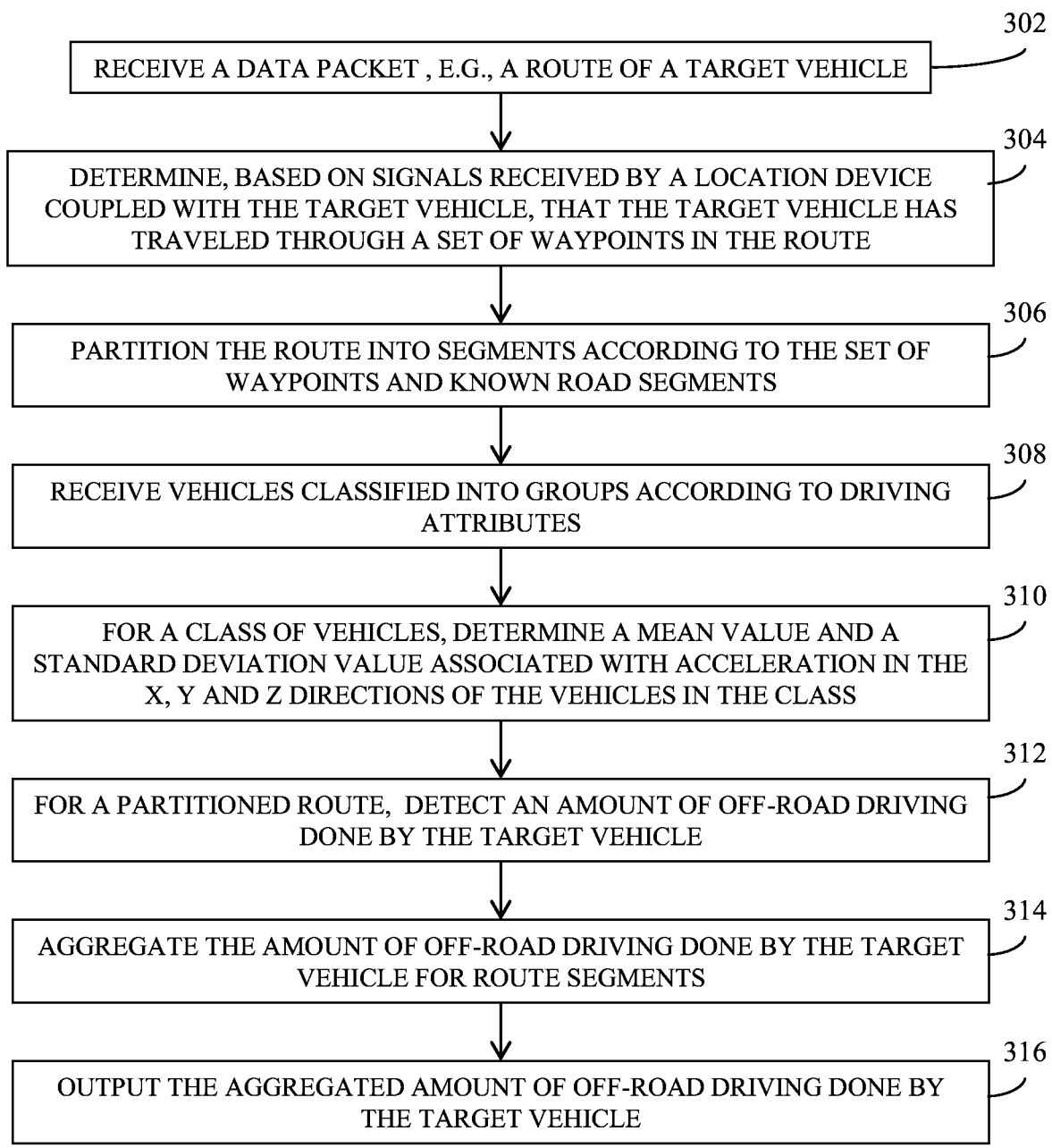
FIG. 3 is a flow diagram illustrating a method in one embodiment.

FIG. 3 is a flow diagram illustrating a method in one embodiment. The method may be performed by one or more hardware processors. One or more hardware processors may be operatively coupled with a location device and an accelerometer. Input to the method in one embodiment may include a target vehicle's route, for example, while traveling in an area such as a national park, where vehicles or travelers are advised to stay on authorized paths only and not enter unauthorized spaces, for instance, for safety and/or protection of the environment. At 302, the method may include receiving a data packet, which may include data associated with a route of a target vehicle in the area. At 304, based on signals received by a location device coupled with the target vehicle, a set of waypoints on the route that the target vehicle has traveled is determined. In one aspect, such location signals may be received for vehicles in the area only, such as a national park. For instance, location information or acceleration information need not be received from the vehicle, if the vehicle is not in the area. In one aspect, the target vehicle is notified that such location signals associated with the target vehicle are being received, for instance, providing the target vehicle an option to not participate (e.g., opt-out) in this type of processing.

At 306, the route is partitioned into segments according to the set of waypoints and known road segments. At 308, vehicles classified into groups according to driving attributes are received. A machine learning classifier, for example, may classify vehicles and/or drivers into classes or groups based on their historic driving behavior, which, for example, may include the manner in which a vehicle's gas pedal is applied, the tendency and degree to which the vehicle or driver tends to drive over (or below) the speed limit, the side-to-side jerkiness of the driver, and so on. Such a classifier may be trained using a machine learning algorithm such as an unsupervised machine learning algorithm. At 310, for a class of vehicles, a mean value and a standard deviation value associated with acceleration in x, y and z directions of the vehicles in the class are determined. For instance, the class of vehicles is selected from the classes of vehicles based on driving attributes associated with the target vehicle. In one embodiment, driving attributes may include or indicate at least a suddenness of a motion in left-right direction of steering direction. In one embodiment, driving attributes may include or indicate at least a manner of applying a gas pedal.

At 312, for a route segment (e.g., for each of the route segments), an amount of off-road driving done by the target vehicle is detected. This detection can be done, for example, based on determining whether a mean value associated with the target vehicle's acceleration in the x, y and z directions computed for the route segment is within a threshold (e.g., one or two standard deviations) of the mean value associated with acceleration in x, y and z directions computed for the class of vehicles. The target vehicle's acceleration in x, y and z directions can be measured by an accelerometer, which may be installed on the vehicle. In one aspect, the location device and the accelerometer are contained in an Internet of Things (IoT) device. Such IoT device may be embedded in the target vehicle. At 314, the amount of off-road driving done by the target vehicle for the route segments (e.g., all the route segments) are combined or aggregated. Aggregation, for example, includes summation. At 316, the aggregated amount of off-road driving done by the target vehicle is output. The amount of off-road driving can be measured in terms of driving distance and/or driving time.

Figure 4:
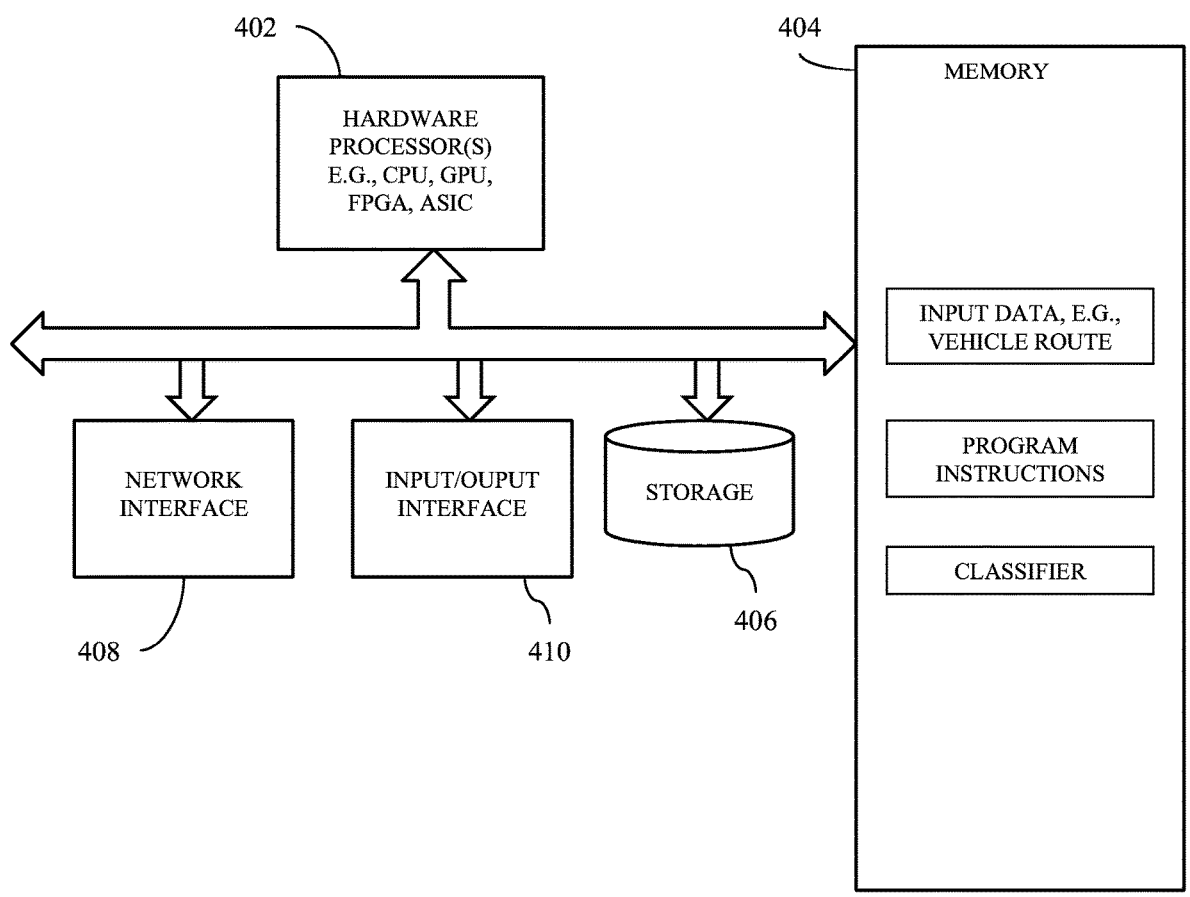
FIG. 4 illustrates a schematic of an example computer or processing system that may implement a system according to one embodiment.

FIG. 4 is a diagram showing components of a system in one embodiment that detects vehicles driving off-road. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and detect vehicles deviating from specified path. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 404 may, for example, store instructions and/or data for the functioning of one or more hardware processors 402, and may include an operating system and other program of instructions and/or data. One or more hardware processors may receive input, which may include a vehicle's route. For instance, at least one hardware processor 402 may perform functions to detect a vehicle's path deviation by comparing the vehicle's acceleration and/or deceleration behavior with other vehicles in the same class. In one aspect, input data may be stored in a storage device 406 or received via a network interface 408 from a remote device, and may be temporarily loaded into the memory device 404. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
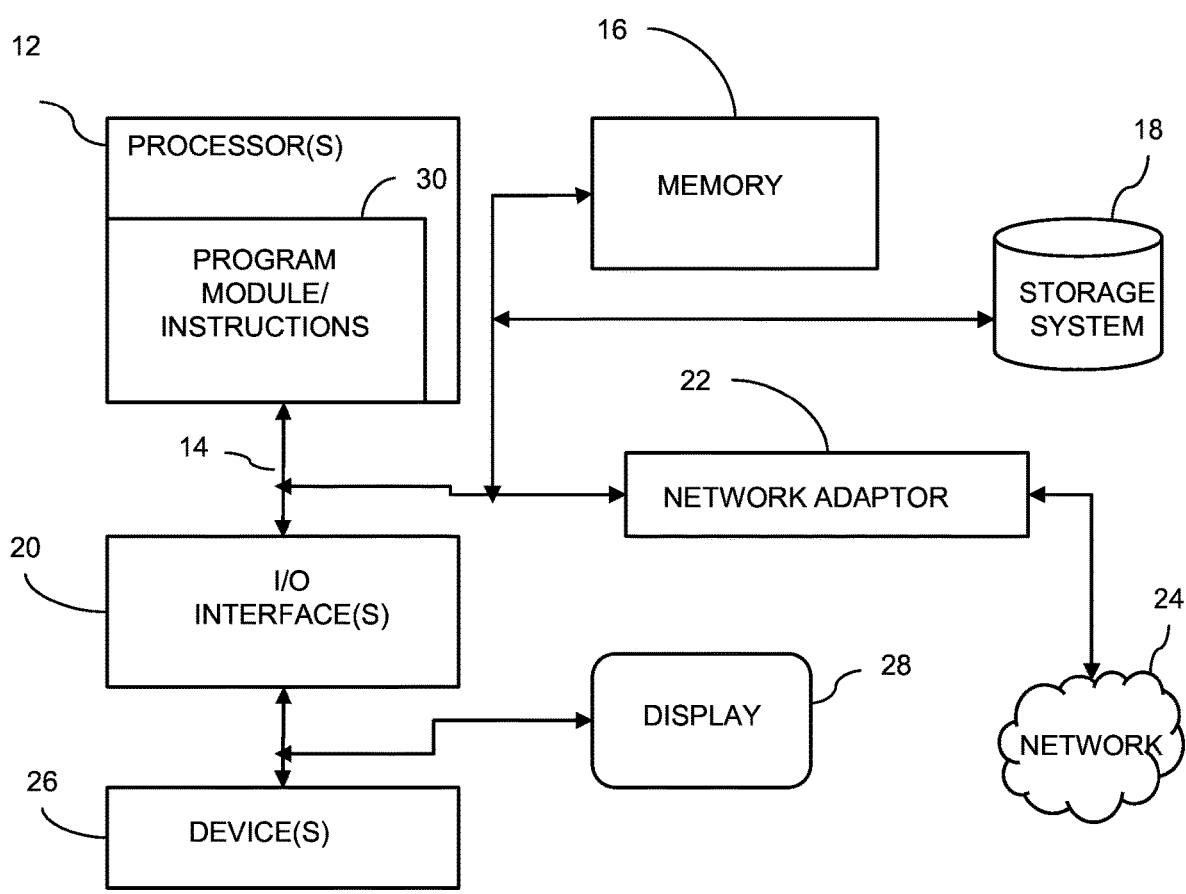
FIG. 5 illustrates a schematic of an example computer or processing system that may implement a system in one embodiment.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one hardware processor;
   a memory device coupled with the at least one hardware processor;
   the at least one hardware processor configured to at least:
   receive a data packet indicating a route of a target vehicle, the route specifying paths the target vehicle is authorized to travel within a designated area;
   based on signals received by a location device, determine that the target vehicle has traveled through a set of waypoints in the route within the designated area;
   partition the route into segments according to the set of waypoints and known road segments;
   receive classes of vehicles classified into groups according to driving attributes;
   for a class of vehicles, receive a mean value and a standard deviation value associated with acceleration in x, y and z directions;
   for a route segment, detect an amount of off-road driving done by the target vehicle, based on comparing x, y and z components of acceleration associated with the target vehicle with a reading from the class of vehicles, time spent on the route segment and expected number of accelerations and decelerations over the route segment, the target vehicle identified with the class of vehicles;
   aggregate the amount of off-road driving done by the target vehicle detected for a plurality of route segments; and
   output the aggregated amount of off-road driving done by the target vehicle.

2. The system of claim 1, wherein the at least one hardware processor, the location device and an accelerometer are mounted on the target vehicle.

3. The system of claim 1, wherein the location device and an accelerometer are contained in an Internet of Things (IoT) device.

4. The system of claim 2, wherein the IoT device is embedded in the target vehicle.

5. The system of claim 1, wherein the class of vehicles is selected from the classes of vehicles based on driving attributes associated with the target vehicle.

6. The system of claim 1, wherein the driving attributes indicate at least a manner of applying a gas pedal.

7. The system of claim 1, wherein the driving attributes indicate at least a suddenness of motion in left-right direction of a steering direction.

8. The system of claim 1, wherein the classes of vehicles are grouped by executing unsupervised machine learning based on the driving attributes associated with the vehicles.

9. The system of claim 1, wherein the amount of off-road driving comprises off-road driving distance.

10. The system of claim 1, wherein the amount of off-road driving comprises off-road driving time.

11. A method comprising:
    receiving a data packet indicating a route of a target vehicle, the route specifying paths the target vehicle is authorized to travel within a designated area;
    based on signals received by a location device coupled with the target vehicle, determining that the target vehicle has traveled through a set of waypoints in the route within the designated area;
    partitioning the route into segments according to the set of waypoints and known road segments;
    receiving classes of vehicles classified into groups according to driving attributes;
    for a class of vehicles, determining a mean value and a standard deviation value associated with acceleration in x, y and z directions of the vehicles in the class;
    for a route segment, detecting an amount of off-road driving done by the target vehicle, based on comparing x, y and z components of acceleration associated with the target vehicle with a reading from the class of vehicles, time spent on the route segment and expected number of accelerations and decelerations over the route segment, the target vehicle identified with the class of vehicles;
    aggregating amount of off-road driving done by the target vehicle for a plurality of route segments; and
    outputting the aggregated amount of off-road driving done by the target vehicle.

12. The method of claim 11, wherein the class of vehicles is selected from the classes of vehicles based on driving attributes associated with the target vehicle.

13. The method of claim 11, wherein the driving attributes comprises at least a manner of applying a gas pedal.

14. The method of claim 11, wherein the driving attributes indicate at least a suddenness of motion in left-right direction of a steering direction.

15. The method of claim 11, the classes of vehicles are grouped by executing an unsupervised machine learning based on the driving attributes associated with the vehicles.

16. The method of claim 11, wherein the amount of off-road driving indicates off-road driving distance.

17. The method of claim 11, wherein the amount of off-road driving indicates off-road driving time.

18. A computer program product comprising a computer readable storage medium having program instructions embodied therewith, the program instructions executable by a device to cause the device to:
- receive a data packet indicating a route of a target vehicle, the route specifying paths the target vehicle is authorized to travel within a designated area;
- based on signals received by a location device, determine that the target vehicle has traveled through a set of waypoints in the route within the designated area;
- partition the route into segments according to the set of waypoints and known road segments;
- receive classes of vehicles classified into groups according to driving attributes;
- for a class of vehicles, receive a mean value and a standard deviation value associated with acceleration in x, y and z directions;
- for a route segment, detect an amount of off-road driving done by the target vehicle, based on comparing x, y and z components of acceleration associated with the target vehicle with a reading from the class of vehicles, time spent on the route segment and expected number of accelerations and decelerations over the route segment, the target vehicle identified with the class of vehicles;
- aggregate the amount of off-road driving done by the target vehicle detected for all a plurality of route segments; and
- output the aggregated amount of off-road driving done by the target vehicle.

19. The computer program product of claim 18, wherein the driving attributes indicate at least a manner of applying a gas pedal.

20. The computer program product of claim 18, wherein the driving attributes indicate at least a suddenness of motion in left-right direction of a steering direction.

* * * * *